United States Patent
Thesing et al.

(10) Patent No.: US 10,006,493 B2
(45) Date of Patent: Jun. 26, 2018

(54) SCREW CONNECTION FOR A NON-SHIFTABLE MULTI-PLATE CLUTCH, AND MULTI-PLATE CLUTCH

(71) Applicant: RENK AKTIENGESELLSCHAFT, Augsburg (DE)

(72) Inventors: Andreas Thesing, Rheine (DE); Michael Kösters, Neuenkirchen (DE)

(73) Assignee: RENK Aktiengesellschaft, Augsburg (DE)

( * ) Notice: Subject to any disclaimer, the term of this patent is extended or adjusted under 35 U.S.C. 154(b) by 530 days.

(21) Appl. No.: 14/775,350

(22) PCT Filed: Mar. 12, 2014

(86) PCT No.: PCT/EP2014/054886
§ 371 (c)(1),
(2) Date: Sep. 11, 2015

(87) PCT Pub. No.: WO2014/140128
PCT Pub. Date: Sep. 18, 2014

(65) Prior Publication Data
US 2016/0025149 A1  Jan. 28, 2016

(30) Foreign Application Priority Data
Mar. 12, 2013 (DE) .................. 10 2013 004 200

(51) Int. Cl.
| | | |
|---|---|---|
| F16D 3/78 | (2006.01) | |
| F16B 5/02 | (2006.01) | |
| F16D 3/79 | (2006.01) | |
| F16B 35/04 | (2006.01) | |
| F16D 3/77 | (2006.01) | |

(52) U.S. Cl.
CPC .................. *F16D 3/78* (2013.01); *F16B 5/02* (2013.01); *F16B 35/048* (2013.01); *F16D 3/79* (2013.01); *F16B 35/041* (2013.01); *F16D 3/77* (2013.01)

(58) Field of Classification Search
None
See application file for complete search history.

(56) References Cited

U.S. PATENT DOCUMENTS

| | | | | |
|---|---|---|---|---|
| 1,115,307 A | * | 10/1914 | Guffee | F16B 41/002 29/235 |
| 1,394,608 A | * | 10/1921 | Davern | F16B 35/044 29/271 |

(Continued)

FOREIGN PATENT DOCUMENTS

| | | |
|---|---|---|
| DE | 86 09 743 | 7/1896 |
| DE | 38 22 207 | 10/1989 |

(Continued)

*Primary Examiner* — Colby M Hansen
(74) *Attorney, Agent, or Firm* — Cozen O'Connor

(57) ABSTRACT

Screw connection for a non-shiftable multiple plate clutch with a clamping bolt, a bolt nut cooperating with the clamping bolt, and a clamping bushing which likewise cooperates with the clamping bolt. A seat between the clamping bolt and clamping bushing has at least one gradation such that a first cylindrical seat surface having a first diameter is formed at a first side of the respective gradation and a second cylindrical seat surface having a second diameter is formed at a second side of the respective gradation.

11 Claims, 1 Drawing Sheet

(56) References Cited

U.S. PATENT DOCUMENTS

| | | | | |
|---|---|---|---|---|
| 3,979,994 | A | * | 9/1976 | Collignon .............. E02F 9/006 411/351 |
| 4,254,542 | A | * | 3/1981 | Craig .................... E04B 1/2403 29/271 |
| 6,935,005 | B2 | * | 8/2005 | Avery ................ B25B 27/0035 29/273 |

FOREIGN PATENT DOCUMENTS

| | | |
|---|---|---|
| DE | 196 25 318 | 1/1998 |
| WO | WO 2011/109658 | 9/2011 |

* cited by examiner

SCREW CONNECTION FOR A NON-SHIFTABLE MULTI-PLATE CLUTCH, AND MULTI-PLATE CLUTCH

CROSS REFERENCE TO RELATED APPLICATIONS

This is a U.S. national stage of application No. PCT/EP2014/054886, filed on Mar. 12, 2014. Priority is claimed on German Application No. DE102013004200.3, filed Mar. 12, 2013, the content of which is incorporated herein by reference.

BACKGROUND OF THE INVENTION

1. Field of the Invention

The invention is directed to a screw connection for a non-shiftable multiple plate clutch and a multiple plate clutch.

2. Detailed Description of the Prior Art

A screw connection for a non-shiftable multiple plate clutch having a clamping bolt, a bolt nut cooperating with the clamping bolt, and a clamping bushing also cooperating with the clamping bolt is known from DE 196 25 318 C2. According to this prior art, a conical seat is formed between the clamping bushing and the clamping bolt. The clamping bushing cooperating with the clamping bolt supports a further clamping bushing on the radially outer side. A plate stack is fixed between this further clamping bushing and a clamping ring.

SUMMARY OF THE INVENTION

Against this background, it is an object of the invention to provide a novel screw connection for a non-shiftable multiple plate clutch and a novel multiple plate clutch.

According to one embodiment of the invention, a seat between the clamping bolt and clamping bushing has at least one gradation such that a first cylindrical seat surface having a first diameter is formed at a first side of the respective gradation and a second cylindrical seat surface having a second diameter is formed at a second side of the respective gradation.

The screw connection according to one embodiment of the invention can be assembled with little effort. Because of the gradation in the seat between the clamping bolt and clamping bushing, the clamping bushing can be pre-mounted on the clamping bolt without auxiliary elements such that a threaded portion of the clamping bolt penetrates the clamping bushing and the bolt nut of the screw connection can be positioned on the threaded portion. For assembly, the bolt nut need merely be tightened. This is also possible when there is an interference between clamping bolt and clamping bushing in uninstalled condition for reducing or preventing assembly clearance.

The first side of the respective gradation faces a clamping bolt head of the clamping bolt, the second side of the respective gradation faces the bolt nut, and the first diameter of the first cylindrical seat surface is greater than the second diameter of the second cylindrical seat surface. This configuration is especially advantageous.

According to an advantageous further development of the invention, the clamping bushing, which serves as a plate stack support, has a radial projection at one axial end at which a plate stack can be supported. This further reduces assembly effort because a separate plate stack support is dispensed with.

BRIEF DESCRIPTION OF THE DRAWINGS

Without limiting generality, embodiment examples of the invention will be described more fully with reference to the drawings. The drawings show.

DETAILED DESCRIPTION OF THE PRESENTLY PREFERRED EMBODIMENTS

The present invention is directed to a screw connection for a non-shiftable multiple plate clutch and to a multiple plate clutch with screw connections of this type.

Figure 1:
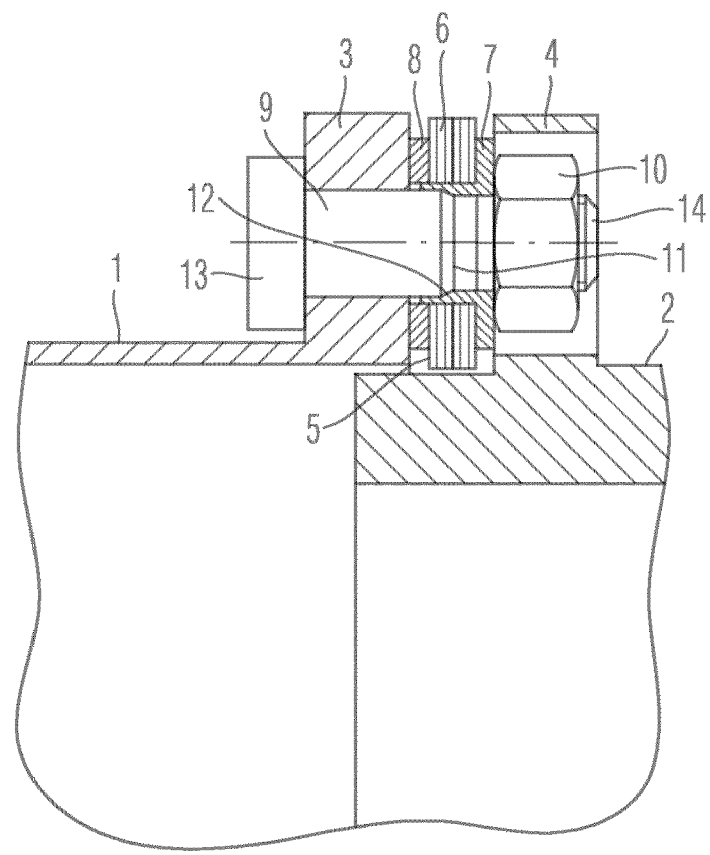
FIG. 1 is a section of a non-shiftable multiple plate clutch in the region of a screw connection according to the invention for a non-shiftable multiple plate clutch.

FIG. 1 shows a section of a non-shiftable multiple plate clutch in the region of a screw connection. The multiple plate clutch comprises two clutch parts 1 and 2 which are to be connected to one another via a screw connection. A first flange 3 is formed at a first clutch part 1 and a second flange 4 is formed at a second clutch part 2. A plate stack 5 of the multiple plate clutch comprising a plurality of plates 6 is positioned between these two flanges 3 and 4 of the two clutch parts 1 and 2.

The screw connection according to the invention presses the plate stack 5 axially without clearance between the two flanges 3 and 4 of the two clutch parts 1 and 2.

The screw connection for a non-shiftable multiple plate clutch of this type comprises a clamping bolt 9, a bolt nut 10 cooperating with the clamping bolt 9, and a clamping bushing 7 that cooperates with the clamping bolt 9. A clamping bolt head 13 being formed at one axial end of the clamping bolt 9. At the axially opposite end, the clamping bolt 9 has a screw thread 14 that cooperates with a corresponding thread of the bolt nut 10.

Within the meaning of the present invention, a seat formed between the clamping bolt 9 and the clamping bushing 7 has a gradation between the clamping bolt 9 and clamping bushing 7, which gradation is provided by a gradation 11 of the clamping bolt 9 and a corresponding gradation 12 of the clamping bushing 7. A first cylindrical seat surface with a first diameter is formed between the clamping bolt 9 and the clamping bushing 7 at a first side of these gradations 11, 12, and a second cylindrical seat surface with a second diameter is formed between the clamping bolt 9 and clamping bushing 7 at a second side of the gradations 11, 12.

The first cylindrical seat surface faces the clamping bolt head 13 of the clamping bolt 9, whereas the second cylindrical seat surface faces the bolt nut 10, and the first diameter of the first cylindrical seat surface is greater than the second diameter of the second cylindrical seat surface.

The clamping bushing 7, which has its gradation 12 in the area of a radially inner surface, preferably serves as a support for the plate stack 5, the clamping bushing 7 having at one axial end a radial projection at which the plate stack 5 is supported.

The plate stack 5 is axially pressed between the radial projection of the clamping bushing 7 and a separate clamping disk 8. The clamping disk 8 is supported at the first flange 3 of the first clutch part 1.

The bolt nut 10 can directly contact the clamping bushing 7 or, alternatively, the second flange 4 of the second clutch part 2, in which case the radial projection of the clamping bushing 7 contacts the second flange 4 of the second clutch part 2.

Figure 2:
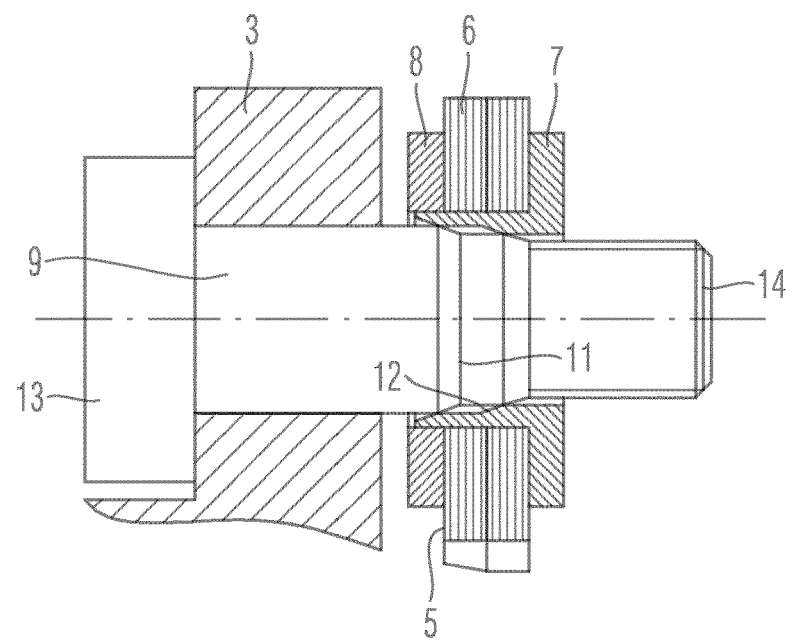
FIG. 2 is the section from FIG. 1 in partially assembled condition.

FIG. 2 shows a section from the arrangement in FIG. 1 in partially assembled condition. For assembly, the clamping bolt 9 is inserted through a bore in the first flange 3 of the first clutch part 1 until the clamping bolt head 13 contacts the first flange 3 of the first clutch part 1. Subsequently, the plate stack 5 is placed on the clamping bolt 9 together with the clamping bushing 7 and clamping disk 8 so that, as a result of the gradations 11, 12 at clamping bolt 9 and clamping bushing 7, the clamping bushing 7 can be fitted axially to the clamping bolt 9 without auxiliary means until a portion of the clamping bolt 9 having the screw thread 14 projects out of the clamping bushing 7. The unit comprising plate stack 5, clamping bushing 7 and clamping disk 8 can be manually fitted to the clamping bolt 9 without auxiliary elements until the latter has reached the position shown in FIG. 2. Subsequently, after positioning the second clutch part 2 and fitting the bolt nut 10 on the portion of the clamping bolt 9 having the screw thread 14, the multiple plate clutch can be pressed in axial direction, namely, simply by tightening the bolt nut 10. As has already been stated, the clamping bushing 7 having gradation 12 on the radially inner side serves as a support of the plate stack 5. Consequently, a separate plate stack support is dispensed with.

Accordingly, within the meaning of one embodiment of the present invention a gradation is formed in the area of the seat between the clamping bolt 9 and clamping bushing 7, which gradation is formed by corresponding gradations 11, 12 of clamping bolt 9 and clamping bushing 7. These gradations 11, 12 of clamping bushing 7 and clamping bolt 9 have a bevel in the embodiment example depicted.

A first cylindrical seat surface with a first, relatively large diameter is formed by gradations 11, 12 between the clamping bushing 7 and the clamping bolt 9 at a side of the gradations 11, 12 facing the clamping bolt head 13. A second cylindrical seat surface with a second relatively small diameter is formed at a second side of the gradations 11, 12 facing the bolt nut 10.

An interference relative to the recess of the clamping bushing 7 is formed at least in the region of the first cylindrical seat surface with the first diameter at clamping bolt 9. This means that, in unassembled condition, the clamping bolt 9 has, at a portion which when assembled with a corresponding portion of the clamping bushing 7 defines a first cylindrical seat surface between clamping bolt 9 and clamping bushing 7, an outer diameter which is greater than the inner diameter of the corresponding portion of the clamping bushing 7. During assembly, the clamping bolt 9 undergoes a transverse deformation, and the above-mentioned interference compensates an assembly clearance occurring as a result of the transverse deformation. An interference of the clamping bolt 9 relative to the clamping bushing of this kind can also be provided in the region of the second cylindrical seat surface.

During assembly, as has already been stated, the clamping bolt 9 with the smaller shank diameter is first of all inserted into the clamping bushing 7 without a constrained position being brought about between the clamping bolt 9 and clamping bushing 7 as a result of an intentional interference of the clamping bolt 9 with respect to the clamping bushing 7. In so doing, the clamping bolt 9 can penetrate the clamping bushing 7 until the screw thread 14 of the clamping bolt 9 protrudes over the clamping bushing 7, and the bolt nut 10 can accordingly be screwed on with sufficient overlap on the portion of the clamping bolt 9 having the screw thread 14. The axial pressing of the plate stack 5 is carried out by tightening the bolt nut 10, and the above-mentioned radial interference of the clamping bolt 9 with respect to the clamping bushing 7 compensates for assembly clearance.

The seat between the clamping bolt 9 and clamping bushing 7 can also have more than one gradation, in which case more than two cylindrical seat surfaces with gradated diameters are formed.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A screw connection for a non-shiftable multiple plate clutch comprising:
    a clamping bolt;
    a bolt nut threadingly connectable to the clamping bolt;
    a clamping bushing configured to be arranged on the clamping bolt; and
    a seat between the clamping bolt and clamping bushing having at least one gradation such that a first cylindrical seat surface having a first diameter is formed at a first side of the respective gradation and a second cylindrical seat surface having a second diameter is formed at a second side of the respective gradation.

2. The screw connection according to claim 1, wherein
    the first cylindrical seat surface faces a clamping bolt head of the clamping bolt and the second cylindrical seat surface faces the bolt nut, and
    the first diameter of the first cylindrical seat surface is greater than the second diameter of the second cylindrical seat surface.

3. The screw connection according to claim 1, wherein the at least one gradation of the seat that separates the first cylindrical seat surface and second cylindrical seat surface is formed by gradations (11, 12) of the clamping bushing and the clamping bolt.

4. The screw connection according to claim 1, wherein an interference relative to the clamping bushing is formed at least in a region of the first cylindrical seat surface of the clamping bolt.

5. The screw connection according to claim 1, wherein the clamping bushing is a plate stack support.

6. The screw connection according to claim 1, wherein the clamping bushing has a radial projection at one axial end configured to support a plate stack.

7. A multiple plate clutch comprising:
a first clutch part;
a second clutch part; and
a plurality of screw connections for a non-shiftable connection of the first clutch part and the second clutch part, wherein each screw connection comprises:
a clamping bolt;
a bolt nut threadingly connected to the clamping bolt;
a clamping bushing arranged on the clamping bolt; and
a seat between the clamping bolt and clamping bushing having at least one gradation such that a first cylindrical seat surface having a first diameter is formed at a first side of the respective gradation and a second cylindrical seat surface having a second diameter is formed at a second side of the respective gradation.

8. The multiple plate clutch according to claim 7,
wherein the clamping bushing of each screw connection is arranged between a first flange of the first clutch part and a second flange of the second clutch part,
wherein the clamping bolt of each respective screw connection is supported by a clamping bolt head at the first flange of the first clutch part and the bolt nut of the respective screw connection is supported at one of the second flange of the second clutch part and the clamping bushing.

9. The multiple plate clutch according to claim 8, wherein a plate stack of the multiple plate clutch is clamped between the first flange and the second flange, namely, between a radial projection of the clamping bushing formed at an axial end of the clamping bushing and a clamping disk which is positioned at an opposite axial end of the clamping bushing.

10. The multiple plate clutch according to claim 9, wherein a plate stack of the multiple plate clutch is clamped a radial projection of the clamping bushing formed at an axial end of the clamping bushing and a clamping disk positioned at an opposite axial end of the clamping bushing.

11. The multiple plate clutch according to claim 1, wherein the clamping disk faces the clamping bolt head of the clamping bolt and the radial projection of the clamping bushing faces the bolt nut.

* * * * *